United States Patent
Zhang et al.

(10) Patent No.: US 11,710,266 B2
(45) Date of Patent: Jul. 25, 2023

(54) RENDERING METHOD AND APPARATUS

(71) Applicant: HUAWEI TECHNOLOGIES CO., LTD., Shenzhen (CN)

(72) Inventors: Fan Zhang, Shenzhen (CN); Feng Wang, Shenzhen (CN); Jun Li, Hangzhou (CN); Kelan Song, Shenzhen (CN); Qichao Zhu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/388,651

(22) Filed: Jul. 29, 2021

(65) Prior Publication Data

US 2021/0358192 A1    Nov. 18, 2021

Related U.S. Application Data

(63) Continuation of application No. PCT/CN2020/072931, filed on Jan. 19, 2020.

(30) Foreign Application Priority Data

Jan. 30, 2019    (CN) .................... 201910093652.7

(51) Int. Cl.
*G06T 15/00*    (2011.01)
*G06T 15/04*    (2011.01)

(52) U.S. Cl.
CPC ............ *G06T 15/005* (2013.01); *G06T 15/04* (2013.01)

(58) Field of Classification Search
CPC .............................. G06T 15/005; G06T 15/04
See application file for complete search history.

(56) References Cited

U.S. PATENT DOCUMENTS 6,288,722 B1 *   9/2001   Narayanaswami .... G09G 5/399
                                                        345/473
7,057,620 B2     6/2006   Aleksic et al.
                         (Continued)

FOREIGN PATENT DOCUMENTS

CN       103617031 A       3/2014
CN       103679802 A       3/2014
                     (Continued)

OTHER PUBLICATIONS

International Search Report issued in corresponding International Application No. PCT/CN2020/072931, dated Apr. 23, 2020, pp. 1-10.

(Continued)

*Primary Examiner* — Abderrahim Merouan
(74) *Attorney, Agent, or Firm* — Hauptman Ham, LLP

(57) ABSTRACT

Embodiments of this application provide a rendering method and apparatus, and the like. The method includes: A processor (which is usually a CPU) modifies a rendering instruction based on a relationship between a first frame buffer and a second frame buffer, so that a GPU renders a rendering job corresponding to the first frame buffer to the second frame buffer based on a new rendering instruction. In this application, render passes of one or more frame buffers are redirected to another frame buffer. In this way, memory occupation in a rendering process of an application program is effectively reduced, bandwidth of the GPU is reduced, and power consumption can be reduced.

14 Claims, 7 Drawing Sheets

(56) References Cited

U.S. PATENT DOCUMENTS

| | | | |
|---|---|---|---|
| 8,102,398 | B2 | 1/2012 | Bajic et al. |
| 9,201,487 | B2 | 12/2015 | Akenine-Moller et al. |
| 9,406,165 | B2* | 8/2016 | Marvie .................... G06T 1/60 |
| 9,824,667 | B2* | 11/2017 | Jung ........................ G09G 5/39 |
| 2003/0025648 | A1* | 2/2003 | Glen .................... H04N 21/426 |
| | | | 345/2.3 |
| 2004/0156381 | A1* | 8/2004 | Fischer .................. H04L 49/90 |
| | | | 370/429 |
| 2005/0046633 | A1 | 3/2005 | Aleksic et al. |
| 2012/0062573 | A1* | 3/2012 | Kashimoto ............... G06T 1/60 |
| | | | 345/501 |
| 2013/0113801 | A1* | 5/2013 | Monson .................... G06T 1/20 |
| | | | 345/426 |
| 2014/0063014 | A1 | 3/2014 | Goel et al. |
| 2014/0300616 | A1* | 10/2014 | Zou .......................... G06T 1/60 |
| | | | 345/545 |
| 2017/0358054 | A1* | 12/2017 | Ciechanowski ...... G06T 15/005 |
| 2018/0164586 | A1* | 6/2018 | Jin ....................... H04N 5/0736 |
| 2018/0197323 | A1* | 7/2018 | Howson .................. G06T 11/40 |
| 2018/0350044 | A1 | 12/2018 | Ponto et al. |
| 2019/0340812 | A1* | 11/2019 | Fuetterling ............... G06T 9/00 |
| 2021/0358192 | A1* | 11/2021 | Zhang .................... G06T 15/04 |

FOREIGN PATENT DOCUMENTS

| | | |
|---|---|---|
| CN | 103810742 A | 5/2014 |
| CN | 104740873 A | 7/2015 |
| CN | 104751507 A | 7/2015 |
| CN | 104882089 A | 9/2015 |
| CN | 105511962 A | 4/2016 |
| CN | 105631923 A | 6/2016 |
| CN | 106296785 A | 1/2017 |
| CN | 107223264 A | 9/2017 |
| CN | 109168068 A | 1/2019 |
| CN | 109240630 A | 1/2019 |
| EP | 3032492 A1 | 6/2016 |
| JP | 2016110655 A | 6/2016 |

OTHER PUBLICATIONS

Akenine-Moller T et al: "Graphics Processing Units for Handhelds",Proceedings of the IEEE, IEEE. New York, US,vol. 96, No. 5,May 1, 2008 (May 1, 2008), pp. 779-789, XP011207044,ISSN: 0018-9219.

European Search Report issued in corresponding European Application No. 20749133.3, dated Mar. 15, 2022, pp. 1-8.

Yong-Ha Park et al., "Single chip 3D rendering engine integrating embedded DRAM frame buffer and hierarchical octet tree (MOT) array processor with bandwidth amplification",Feb. 2-2, 2001,total:2pages.

Lu Hui-qiang et al.,"Research of algorithms of complex web}ased 3D scene rendering",Feb. 2003,total:6pages.

Chinese Office Action issued in corresponding Chinese Application No. 201910093652.7, dated Apr. 29, 2022, pp. 1-7.

Chinese Office Action issued in corresponding Chinese Application No. 201910093652.7, dated Oct. 8, 2022, pp. 1-9.

* cited by examiner

RENDERING METHOD AND APPARATUS

CROSS-REFERENCE TO RELATED APPLICATIONS

This application is a continuation of International Application No. PCT/CN2020/072931, filed on Jan. 19, 2020, which claims priority to Chinese Patent 201910093652.7, filed on Jan. 30, 2019. The disclosures of the aforementioned applications are hereby incorporated by reference in their entireties.

TECHNICAL FIELD

Embodiments of this application relate to computer technologies, and in particular, to a graphics or image rendering method and apparatus, and the like.

BACKGROUND

Currently, with the rise of a large-scale 3D game or a 3D-based application program, there is an improvement in picture quality and an increase in function of a program (including a game and another application), but memory occupation and system power consumption increase accordingly.

Therefore, how to reduce mobile phone memory and power consumption is of vital importance to a mobile phone manufacturer.

To reduce game memory and power consumption, in the prior art, an implementation is a texture compression technology. For a large-scale 3D game, texture mapping is extensively used (it should be noted that texture mapping is a process of mapping a texture pixel in texture space to a pixel in screen space, to be specific, a process of changing an appearance of an image at each location by using an image, a function, or another data source). Currently, it is very common to perform texture mapping mainly by using a graphics engine, so that a same picture can be mapped to screen space with different resolutions or of different sizes. This can improve richness of an application picture. However, texture mapping needs a large amount of memory. Therefore, an application developer often compresses a texture to reduce memory usage.

A texture map is stored in a video random access memory in an uncompressed form. Common texture map formats are 16-bit, 24-bit, and 32-bit. A size of a 16-bit 1024×1024 map in the video random access memory is up to 2 MB. To accelerate rendering and resolve a flickering problem caused during mapping, a texture mapping technology (Mipmap) is currently used. In this technology, during texture loading, not a single texture but a series of textures in descending order of size are loaded, and then OpenGL (Open Graphics Library, a professional cross-programming language, cross-platform graphics programming interface of a programming interface specification) selects a most appropriate texture based on a size of a given geometric image. In Mipmap, a texture is scaled by a multiple of 2 until a size of an image is 1×1. All images are then stored, and an appropriate image is selected for use. Some extra memory is added by using the Mipmap technology. For example, if the Mipmap technology is used in texture mapping of a square, approximately one third of memory space is added.

Currently, in most applications, texture mapping is used to enrich application scenarios and reduce rendering complexity. Therefore, memory (video random access memory) overheads can be greatly reduced through texture compression.

Another implementation in the prior art is to reduce idle power consumption by reducing a voltage or a frequency in an idle time period. Specifically, in an application rendering process, a rendering time and peak power consumption of each frame may vary with drawing content of each frame. In this case, in a frame rendering process, no rendering is performed in a time period, namely, an idle time period. In the prior art, the idle power consumption is reduced by reducing the voltage or the frequency in the idle time period, to reduce system power consumption.

In conclusion, in the prior art, a rendering optimization process depends on an application manufacturer, and an optimization method such as the texture compression technology can be used to optimize only memory or power consumption, but cannot be used to optimize both the memory and the power consumption.

SUMMARY

This application provides a rendering method and apparatus, so that both memory and power consumption can be optimized in a rendering process, to improve user experience.

To achieve the foregoing objective, the following technical solutions are used in this application:

According to a first aspect, an embodiment of this application provides a rendering method. The method includes: A CPU may determine a rendering instruction based on a relationship between a first frame buffer and a second frame buffer. The rendering instruction may be used to instruct a GPU to render a rendering job corresponding to the first frame buffer to the second frame buffer. In addition, the relationship between the first frame buffer and the second frame buffer is used to indicate that a render pass of the first frame buffer may be redirected to the second frame buffer. Optionally, in a possible implementation, the determining a rendering instruction may specifically mean recompiling or modifying the rendering instruction, so that the GPU performs a rendering operation based on a recompiled or modified rendering instruction.

In the foregoing manner, render passes of one or more frame buffers are redirected to another frame buffer, to reduce a quantity of frame buffers used in a rendering process. In this way, memory and bandwidth of the GPU that are occupied by operations such as read/write and copy are reduced, and power consumption can be effectively reduced, thereby improving user experience.

In a possible implementation, the relationship between the first frame buffer and the second frame buffer includes first description information of the first frame buffer and second description information of the second frame buffer. For example, the CPU may determine a redirection relationship between the first frame buffer and the second frame buffer based on a plurality of objects included in the first description information and a plurality of objects included in the second description information. Optionally, in a possible implementation, the CPU may store the first description information of the first frame buffer and the second description information of the second frame buffer, to determine, each time an application is started, the relationship between the first frame buffer and the second frame buffer by detecting the first description information and the second description information.

In the foregoing manner, a relationship between frame buffers is determined.

In a possible implementation, the method further includes: The CPU extracts the first description information of the first frame buffer and the second description information of the second frame buffer; and the CPU may determine the relationship between the first frame buffer and the second frame buffer based on the first description information and the second description information. Optionally, in an embodiment, the CPU may further extract first identification information of the first frame buffer and second identification information of the second frame buffer, and indicate the relationship between the first frame buffer and the second frame buffer by using the identification information. For example, the first identification information and the second identification information may be correspondingly written into a rendering list, to indicate that the render pass of the first frame buffer identified by the first identification information is redirected to the second frame buffer corresponding to the second identification information.

In the foregoing manner, a relationship between frame buffers is determined.

In a possible implementation, the determining the relationship between the first frame buffer and the second frame buffer includes: When the first description information and the second description information meet a preset condition, the CPU determines that the render pass of the first frame buffer may be redirected to the second frame buffer.

In the foregoing manner, a relationship between frame buffers is determined.

In a possible implementation, the description information includes an attribute of the frame buffer, a resolution of the frame buffer, and an input texture map and an output texture map of the frame buffer. The attribute is used to indicate whether an output of the frame buffer is a color.

In the foregoing manner, a device may determine a relationship between frame buffers based on a specific preset condition.

In a possible implementation, the preset condition may include: An output of the first frame buffer is a color, an output texture map of the first frame buffer is an input texture map of the second frame buffer, and a resolution of the first frame buffer is greater than or equal to a resolution of the second frame buffer.

According to a second aspect, an embodiment of this application provides a rendering apparatus. The apparatus may include a first determining module. The module may be configured to determine a rendering instruction based on a relationship between a first frame buffer and a second frame buffer. The rendering instruction may be used to instruct a GPU to render a rendering job corresponding to the first frame buffer to the second frame buffer. In addition, the relationship between the first frame buffer and the second frame buffer is used to indicate that a render pass of the first frame buffer may be redirected to the second frame buffer.

In a possible implementation, the relationship between the first frame buffer and the second frame buffer includes first description information of the first frame buffer and second description information of the second frame buffer.

In a possible implementation, the apparatus further includes an extraction module and a second determining module. The extraction module may be configured to extract the first description information of the first frame buffer and the second description information of the second frame buffer. The second determining module may be configured to determine the relationship between the first frame buffer and the second frame buffer based on the first description information and the second description information.

In a possible implementation, the second determining module may be further configured to: when the first description information and the second description information meet a preset condition, determine that the render pass of the first frame buffer may be redirected to the second frame buffer.

In a possible implementation, the description information includes an attribute of the frame buffer, a resolution of the frame buffer, and an input texture map and an output texture map of the frame buffer. The attribute is used to indicate whether an output of the frame buffer is a color.

In a possible implementation, the preset condition may include: An output of the first frame buffer is a color, an output texture map of the first frame buffer is an input texture map of the second frame buffer, and a resolution of the first frame buffer is greater than or equal to a resolution of the second frame buffer.

According to a third aspect, an embodiment of this application provides a rendering device. The rendering device includes a transceiver/transceiver pin and a processor, and optionally, further includes a memory. The transceiver/transceiver pin, the processor, and the memory communicate with each other by using an internal connection path. The processor is configured to execute an instruction to control the transceiver/transceiver pin to send or receive a signal. The memory is configured to store the instruction. When the processor executes the instruction, the processor performs the method according to any one of the first aspect or the possible implementations of the first aspect.

According to a fourth aspect, an embodiment of this application provides a computer-readable medium, configured to store a computer program. The computer program includes an instruction for performing the method according to any one of the first aspect or the possible implementations of the first aspect.

According to a fifth aspect, an embodiment of this application provides a computer program (or a computer program product). The computer program includes an instruction for performing the method according to any one of the first aspect or the possible implementations of the first aspect.

According to a sixth aspect, an embodiment of this application provides a computer device. The computer device includes a processor and a memory. The memory is configured to store a software program. The processor is configured to: read the software program and implement the method according to any one of the first aspect or the possible implementations of the first aspect.

BRIEF DESCRIPTION OF DRAWINGS

To describe the technical solutions in the embodiments of this application more clearly, the following briefly describes the accompanying drawings used in describing the embodiments of this application. Apparently, the accompanying drawings in the following description show merely some embodiments of this application, and a person of ordinary skill in the art may derive other drawings from these accompanying drawings without creative efforts.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The term "and/or" in this specification describes only an association relationship for describing associated objects and represents that three relationships may exist. For example, A and/or B may represent the following three cases: Only A exists, both A and B exist, and only B exists.

In the specification and claims in the embodiments of this application, the terms "first", "second", and the like are used to distinguish between different objects, and are not used to describe a particular sequence of the objects. For example, a first target object and a second target object are used to distinguish between different target objects, and are not used to describe a particular sequence of the target objects.

In the embodiments of this application, the word such as "example" or "for example" is used to represent giving an example, an illustration, or a description. Any embodiment or design solution described as "an example" or "for example" in the embodiments of this application should not be explained as being more preferred or having more advantages than another embodiment or design solution. Exactly, use of the word such as "example" or "for example" is intended to present a concept in a specific manner.

In the description of the embodiments of this application, unless otherwise stated, "a plurality of" means two or more. For example, "a plurality of processing units" means two or more processing units, and "a plurality of systems" means two or more systems.

Figure 1:
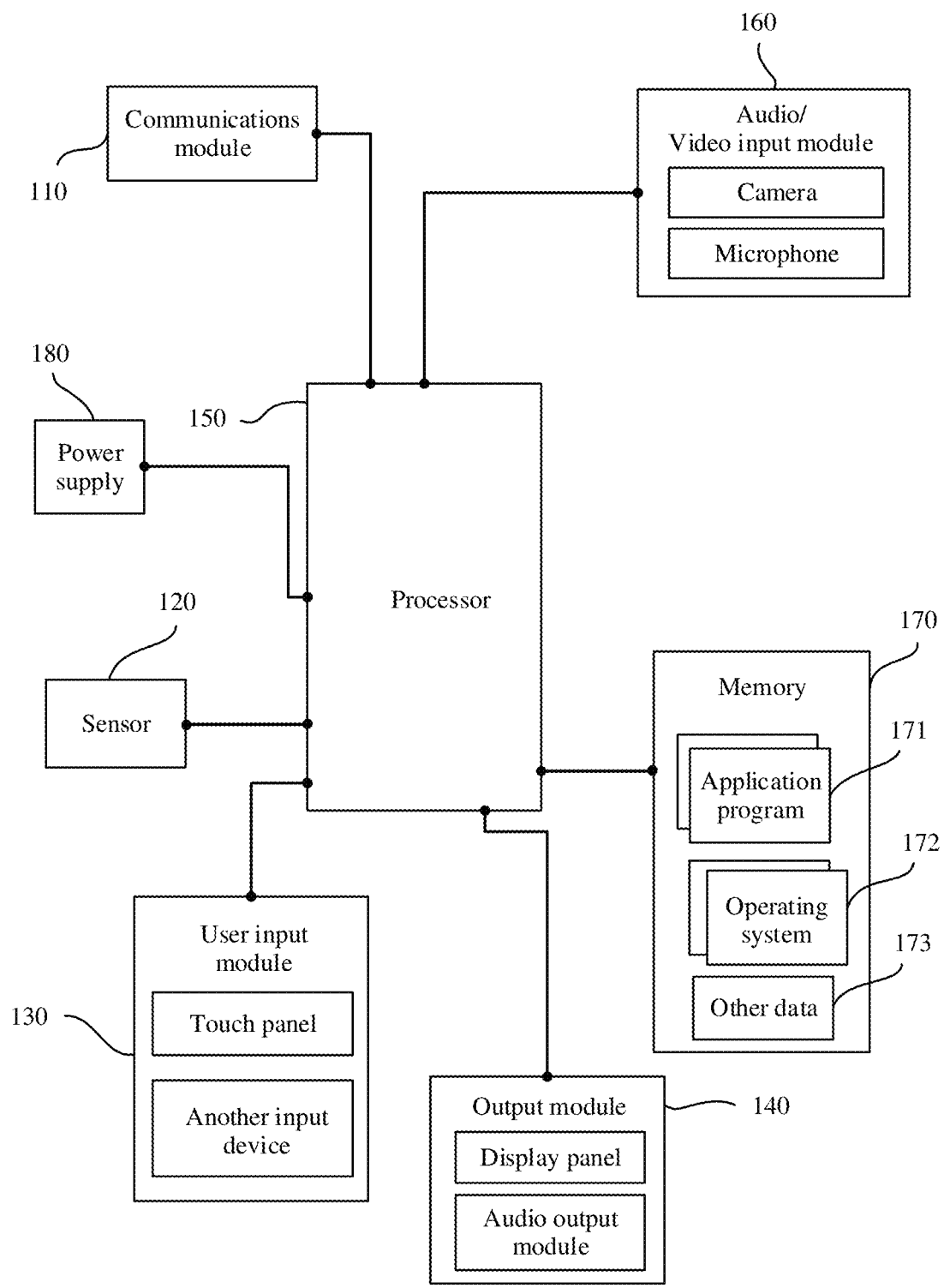
FIG. 1 is a schematic diagram of an apparatus according to an embodiment of this application.

Before the technical solutions in the embodiments of this application are described, an apparatus in the embodiments of this application is first described with reference to the accompanying drawings. FIG. 1 is a schematic diagram of an apparatus according to an embodiment of this application. The apparatus may be a terminal device. As shown in the figure, the apparatus includes a communications module 110, a sensor 120, a user input module 130, an output module 140, a processor 150, an audio/video input module 160, a memory 170, and a power supply 180.

The communications module 110 may include at least one module that can enable the computer system to communicate with a communications system or another computer system. For example, the communications module 110 may include one or more of a wired network interface, a broadcast receiving module, a mobile communications module, a wireless internet module, a local area communications module, and a location (or positioning) information module. The plurality of modules each have a plurality of implementations in the prior art, and the plurality of implementations are not described one by one in this application.

The sensor 120 may sense a current status of the system, for example, an on/off state, a location, whether the system is in contact with a user, a direction, and acceleration/deceleration. In addition, the sensor 120 may generate a sensing signal used to control an operation of the system.

The user input module 130 is configured to: receive entered digital information or character information or a contact touch operation/contactless gesture, and receive signal input related to user settings and function control of the system, and the like. The user input module 130 includes a touch panel and/or another input device.

The output module 140 includes a display panel, configured to display information entered by the user, information provided for the user, various menu interfaces of the system, or the like. Optionally, the display panel may be configured in a form of a liquid crystal display (liquid crystal display, LCD), an organic light-emitting diode (organic light-emitting diode, OLED), or the like. In some other embodiments, the touch panel may cover the display panel, to form a touch display screen. In addition, the output module 140 may further include an audio output module, an alarm, a tactile module, and the like.

The audio/video input module 160 is configured to input an audio signal or a video signal. The audio/video input module 160 may include a camera and a microphone.

The power supply 180 may receive external power and internal power under control of the processor 150, and provide power required by operations of various components of the system.

The processor 150 may indicate one or more processors. For example, the processor 150 may include one or more central processing units, one central processing unit and one graphics processing unit, or one application processor and one coprocessor (for example, a micro control unit or a neural network processor). When the processor 150 includes a plurality of processors, the plurality of processors may be integrated into a same chip, or may be independent chips. One processor may include one or more physical cores, and the physical core is a minimum processing module. The memory 170 stores a computer program, and the computer program includes an operating system program 172, an application program 171, and the like. A typical operating system includes a system used in a tablet computer or a notebook computer, for example, Windows of Microsoft or MacOS of Apple, and also includes a system used in a mobile terminal, for example, a Linux®-based Android (Android®) system developed by Google. The method provided in the foregoing embodiment may be implemented by software, and this may be considered as a specific implementation of the application program 171.

The memory 170 may include one or more of the following types: a flashmemory, a memory of a hard disk type, a memory of a micro multimedia card type, a card-type memory (for example, an SD or XD memory), a random access memory (RAM), a static random access memory (static RAM, SRAM), a read-only memory (ROM), an electrically erasable programmable read-only memory (EEPROM), a programmable read-only memory (PROM), a magnetic memory, a magnetic disk, or an optical disc. In some other embodiments, the memory 170 may be a network storage device in the Internet. The system may perform an update operation, a read operation, or another operation on the memory 170 in the Internet.

The processor 150 is configured to: read the computer program from the memory 170, and then perform a method defined by the computer program. For example, the processor 150 reads the operating system program 172, to run an operating system in the system and implement various functions of the operating system, or reads one or more application programs 171, to run an application in the system.

In addition to the computer program, the memory 170 stores other data 173, for example, a block, a private key, transaction data, and a random number in this application.

A connection relationship among the modules in FIG. 1 is merely an example. A method provided in any embodiment of this application may alternatively be used in a terminal device in another connection manner. For example, all modules are connected by using a bus.

Figure 2:
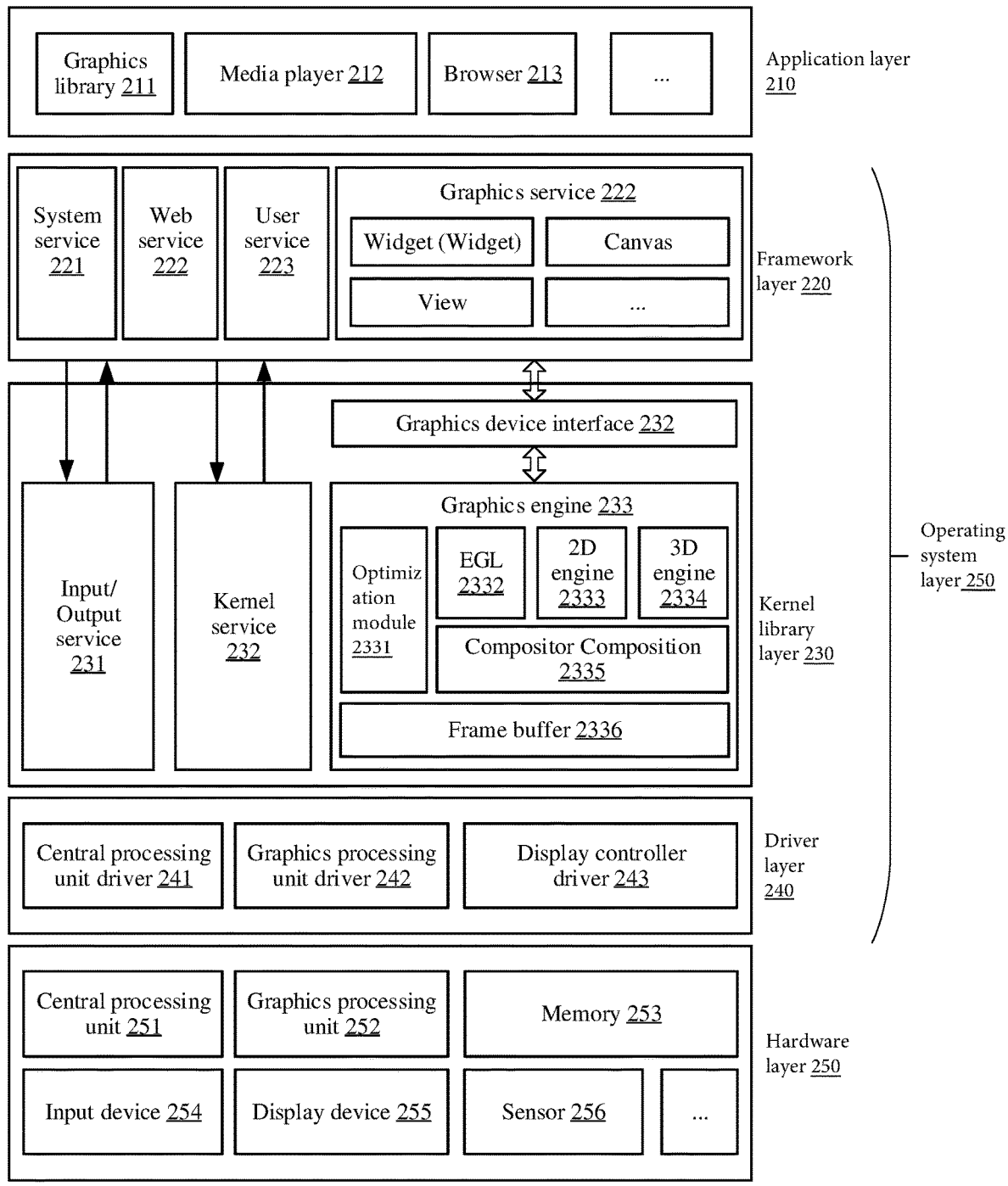
FIG. 2 is a schematic diagram of a computer system according to an embodiment of this application.

Based on FIG. 1, an embodiment of this application further provides a computer system. As shown in FIG. 2, the computer system 200 may be a terminal device, or may be another type of computer device. The computer system includes an application layer 210 and an operating system layer 250. The operating system may be an Android operating system, an iOS system, a Windows system, or the like. The operating system layer 250 is further divided into a framework layer 220, a kernel library layer 230, and a driver layer 240. The operating system layer 250 in FIG. 2 may be considered as a specific implementation of the operating system 172 in FIG. 1, and the application layer 210 in FIG. 2 may be considered as a specific implementation of the application program 171 in FIG. 1. The driver layer 220 includes a CPU driver 241, a GPU driver 242, a display controller driver 243, and the like. The kernel library layer 230 is a core part of the operating system, and includes an input/output service 231, a kernel service 232, a graphics device interface 232, a graphics engine (Graphics Engine) 233 for implementing graphics processing by a CPU or GPU, and the like. The graphics engine 233 may include an optimization module 2331, an EGL (Embedded-System Graphics Library) 2332, a 2D engine 2333, a 3D engine 2334, a compositor 2335, a frame buffer (Frame Buffer) 2336, and the like. The EGL is an interface between a rendering API and an underlying original platform window system, and the API is an application programming interface (Application Programming Interface).

In this embodiment of this application, the optimization module 2331 may obtain an instruction stream in the EGL interface of the graphics engine 233 by using a hook function, and the rendering API interacting between the graphics engine 233 and the underlying original platform window system is diverted to the optimization module 2331. The hook function is used to enable the optimization module 2331 to capture a key API invoked by the graphics device interface 232, and to perform processing such as analysis, reorganization, and optimization on the instruction stream. After completing processing on the instruction (a specific processing process is described in detail in the following embodiments), the optimization module 2331 returns to the EGL to invoke the underlying rendering API to interact with a graphics processing unit (Graphic Processing Unit, GPU) to complete rendering.

The framework layer 220 may include a graphics service 224, a system service 221, a web service 222, a user service (or Customer Service) 223, and the like. The graphic service 224 may include a widget, a canvas, a view, and the like. The application layer 210 may include a graphics library 211, a media player 212, a browser 213, and the like.

In addition, below the driver layer 220, the computer system 200 further includes a hardware layer 250. The hardware layer of the computer system 200 may include a central processing unit (CPU) 251 and a graphics processing unit 252 (equivalent to a specific implementation of the processor 150 in FIG. 1), may further include a memory 253 (equivalent to the memory 170 in FIG. 1), including an internal storage and an external storage, may further include an input device 254 (equivalent to an input device 132 in FIG. 1), a display device 255 (equivalent to the display device 140 in FIG. 1), for example, a liquid crystal display (Liquid Crystal Display, LCD), a holographic imaging device, or a projector (Projector), and may further include one or more sensors 256 (equivalent to the sensor 120 in FIG. 1). Certainly, in addition, the hardware layer 250 may further include a power supply, a camera, an RF circuit, and a Wi-Fi module shown in FIG. 1, and may further include other hardware modules not shown in FIG. 1, for example, a memory controller and a display controller.

Figure 3:
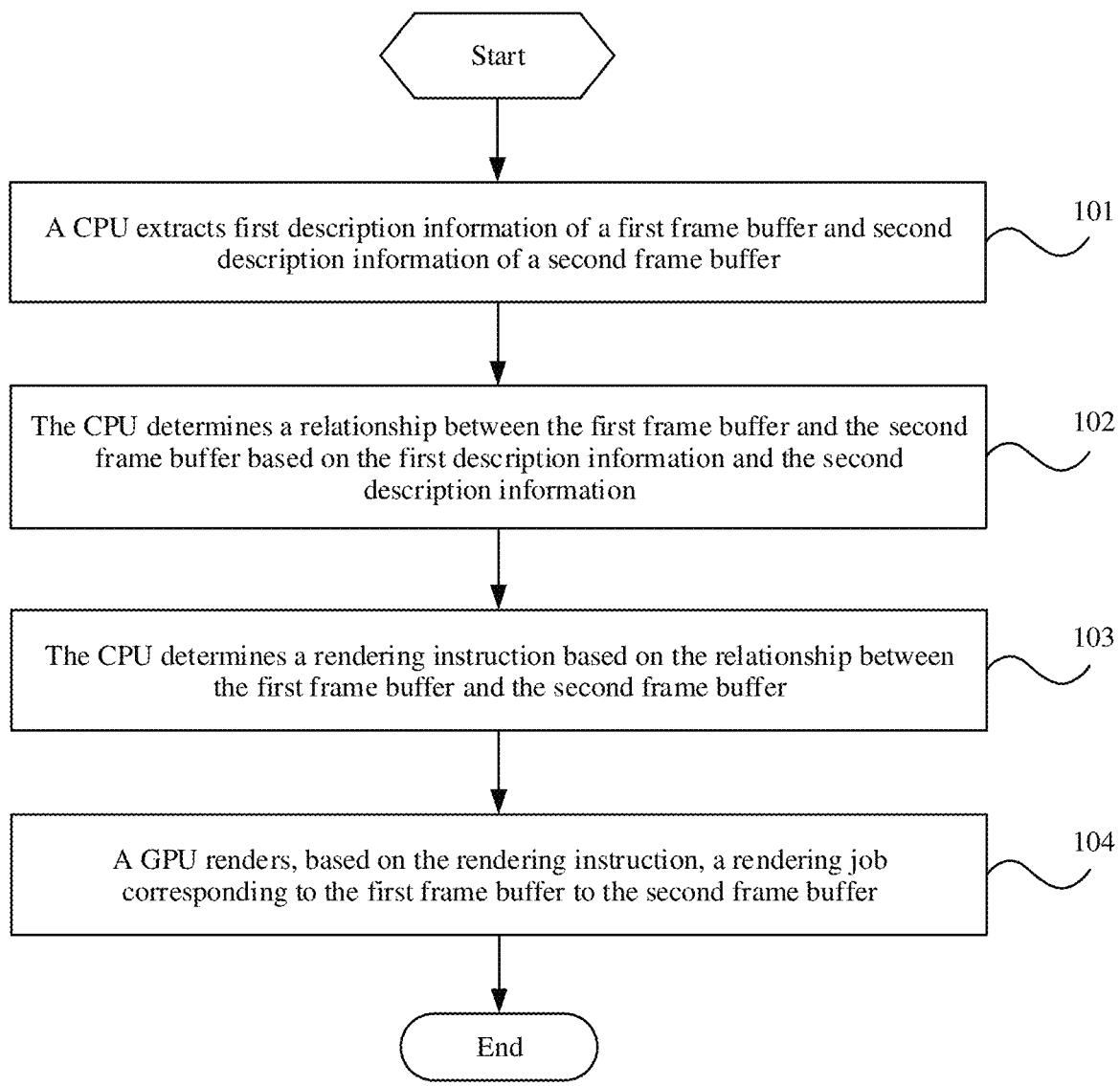
FIG. 3 is a flowchart of a rendering method according to an embodiment of this application.

With reference to the system architecture diagram shown in FIG. 2, FIG. 3 is a schematic flowchart of a rendering method according to an embodiment of this application. In FIG. 3, Specifically, in this embodiment of this application, before executing the technical solution in this embodiment of this application, a device (it should be noted that in this embodiment of this application, a rendering device, a terminal, and/or a rendering apparatus that can execute the technical solution in this embodiment of this application each are/is referred to as a device) detects (or may not detect) whether a condition for running the technical solution in this embodiment of this application is met. Optionally, in this embodiment of this application, the condition includes but is not limited to: An application program includes a rendering procedure. For example, in an application program initialization process, an API of a graphics device interface needs to be invoked. As shown in FIG. 2, an optimization module 2331 in this embodiment of this application is embedded in a graphics engine 233. That is, during game initialization, the optimization module 2331 in this embodiment of this application is also initialized and loaded into an internal storage for running. In an initialization process, the optimization module 2331 may perform detection for the foregoing condition. Specifically, the optimization module 2331 detects whether the application program needs the rendering procedure. If the application program needs the rendering procedure, the optimization module 2331 determines that the condition for running the technical solution in this embodiment of this application is met. In this case, the technical solution in this embodiment of this application may be executed, and step 101 is performed.

It should be noted that in this embodiment of this application, a CPU (which specifically refers to the graphics engine 233) in the device collaborates with a GPU. The graphics engine 233 may be configured to execute and control a main procedure, and the GPU is responsible for performing a rendering procedure based on an execution result of the graphics engine 233. Related processing steps are as follows:

Step 101: The CPU extracts first description information of a first frame buffer and second description information of a second frame buffer.

With reference to FIG. 2, specifically, in this embodiment of this application, in a rendering process, the graphics engine 233 invokes a rendering instruction in an application program, and caches, analyzes, reorganizes, and/or optimizes the rendering instruction. When the rendering instruction is executed for the application program, in an embodiment, the graphics engine 233 may allocate a specified instruction (a specific instruction is described in detail in the following embodiment) to the optimization module 2331 for analysis, reorganization, and optimization. In some other embodiments, when the graphics engine 233 executes the rendering instruction (it should be noted that in this embodiment of this application, that the graphics engine 233 executes the rendering instruction means that the graphics engine 233 invokes and executes the rendering instruction in the application program, and analyzes, reorganizes, and optimizes the rendering instruction, that is, is a process of compiling the rendering instruction. To distinguish from a process in which the GPU executes the rendering instruction, execution of the rendering instruction by the graphics engine 233 is collectively referred to as a compilation process in this embodiment of this application), the optimization module 2331 may monitor the compilation process of the graphics engine 233 in real time, and obtain a compilation result of the graphics engine 233 when detecting that the graphics engine 233 compiles the specified instruction. Specifically, the graphics engine 233 invokes an instruction "glGenFramebuffers" to create two or more frame buffers, and the created frame buffer corresponds to an ID used to identify the frame buffer. After the frame buffers are created, the optimization module 2331 may extract description information of the frame buffers (namely, the first frame buffer and the second frame buffer in this embodiment of this application. It should be noted that if the graphics engine 233 creates more than two frame buffers, the optimization module 2331 extracts description information of a third frame buffer to an $N^{th}$ frame buffer). In this embodiment of this application, the description information includes but is not limited to identification information (Identification, ID) of the frame buffer, attribute information of the frame buffer, resolution information of the frame buffer, and an input texture map and an output texture map of the frame buffer (the output texture map in this embodiment of this application refers to a result generated by rendering a rendering job to a frame buffer and outputting a rendering result to a specified buffer when the CPU or the GPU executes a related instruction, or may be understood as a result generated after a rendering job is rendered to a frame buffer, and the input texture map is a texture map that needs to be introduced for performing rendering to a frame buffer and that is generated for another frame buffer).

The following provides detailed description by using a specific embodiment.

The optimization module 2331 in this embodiment may monitor the process of compiling the rendering instruction by the graphics engine 233, and obtain an ID corresponding to each frame buffer after detecting that the graphics engine 233 performs a frame buffer creation procedure. In some other embodiments, after creating the frame buffers, the graphics engine 233 may deliver the instruction "glGenFramebuffers" to the optimization module 2331 to instruct the optimization module 2331 to execute the instruction, to obtain an ID corresponding to each frame buffer.

The optimization module 2331 then obtains attribute information of each frame buffer. In this embodiment, the attribute information includes but is not limited to a type of the frame buffer. The type of the frame buffer includes but is not limited to: An output of the frame buffer is a color, an output of the frame buffer is a depth type, or the like. The optimization module 2331 further needs to obtain a resolution of each frame buffer and an output texture map and an input texture map of each frame buffer. The resolution may also be used to describe a size of the frame buffer.

In this embodiment, the optimization module 2331 may actively obtain the attribute information, the resolution, and the output/input texture map. That is, the optimization module 2331 monitors the process of executing the rendering instruction by the graphics engine 233, and obtains the corresponding execution result. Specifically, in the process of compiling the rendering instruction, the graphics engine 233 performs a process of extracting the attribute information, the resolution, and the output/input texture map of each frame buffer. Therefore, when detecting that the graphics engine 233 is executing an instruction for extracting the attribute information, the resolution, and the output/input texture map, the optimization module 2331 may obtain the execution result of the graphics engine 233, that is, directly obtain the attribute information, the resolution, and the output/input texture map of each frame buffer from the execution result of the graphics engine 233. In some other embodiments, the graphics engine 233 may actively send related information about the attribute information, the resolution, and the output/input texture map to the optimization module 2331, or allocate a related instruction for extracting the attribute information, the resolution, and the output/input texture map to the optimization module 2331 for execution.

The following provides detailed description by using a specific embodiment. For example, the graphics engine 233 allocates the related extraction instruction to the optimization module 2331 for execution. Specifically, the graphics engine 233 allocates an instruction "glFramebufferTexture" to the optimization module 2331 for execution. After receiving the instruction, the optimization module 2331 executes the instruction, may obtain the attribute information, namely, information about whether an output of each frame buffer is a color, a depth, or the like, of each frame buffer based on an execution result, and may further obtain a size of the frame buffer, namely, resolution information. In addition, the output texture map corresponding to each frame buffer may be obtained by executing the instruction. The obtained output texture map includes but is not limited to an ID of the output texture map (Texture). For example, an output texture map of a frame buffer 5 (it should be noted that the frame buffer 5 is an ID of the frame buffer) is a texture 5 (it should be noted that the texture 5 is an ID of the output texture map corresponding to the frame buffer 5). In this case, the optimization module 2331 may obtain a correspondence between the frame buffer 5 and the texture 5. In addition, the graphics engine 233 allocates an instruction "glBindTexture" to the optimization module 2331 for execution. The optimization module 2331 receives and executes the instruction, and may obtain the input texture map of each frame buffer based on an execution result. For example, an input texture map of the frame buffer 5 is a texture 4. In this case, the optimization module 2331 may obtain a correspondence between the frame buffer 5 and a texture 6.

Then, in this embodiment of this application, the optimization module 2331 may establish a linked list of frame buffers based on the obtained input texture map and output texture map of each frame buffer, to determine a correlation between the frame buffers. For example, an output texture map of a frame buffer 4 is the texture 4, the input texture map of the frame buffer 5 is the texture 4, the output texture map of the frame buffer 5 is the texture 5, an input texture map of a frame buffer 6 is the texture 5, and an output texture map of the frame buffer 6 is the texture 6. Based on the foregoing information, the optimization module 2331 may establish a linked list: frame buffer 4→frame buffer 5→frame buffer 6. That is, a next frame buffer associated with the frame buffer 4 is the frame buffer 5, and a next frame buffer associated with the frame buffer 5 is the frame buffer 6. It should be noted that the optimization module 2331 obtains information about all frame buffers. Therefore, there may be a frame buffer that does not belong to the linked list, namely, an independent frame buffer. Rendering to this type of frame buffer may be independently performed, and this type of frame buffer does not need to be associated with another frame buffer.

Step 102: The CPU determines a relationship between the first frame buffer and the second frame buffer based on the first description information and the second description information.

Specifically, in this embodiment of this application, the CPU (which specifically refers to the optimization module 2331) may determine a relationship between the frame buffers based on the obtained description information of the frame buffers. The relationship between the frame buffers indicates whether the frame buffer can be cut, and a render pass of the frame buffer may be redirected to another frame buffer.

Specifically, in this embodiment of this application, the optimization module 2331 may determine whether the description information of the first frame buffer and the description information of the second frame buffer meet a preset condition. If the optimization module 2331 determines that the description information of the first frame buffer and the description information of the second frame buffer meet the preset condition, it is determined that the first frame buffer can be cut, and a render pass of the first frame buffer may be redirected to the second frame buffer. It should be noted that in the determining process, the optimization module 2331 may perform determining for the frame buffers one by one in terms of the preset condition based on the linked list obtained in step 101, namely, a correlation sequence of the frame buffers.

Optionally, in this embodiment of this application, the preset condition includes but is not limited to: An output of the first frame buffer is a color, that is, an attribute of the frame buffer is a color, an output texture map of the first frame buffer is an input texture map of the second frame buffer, and a resolution of the first frame buffer is greater than or equal to a resolution of the second frame buffer. That is, when the description information of the first frame buffer and the description information of the second frame buffer meet the foregoing condition, it may be determined that the first frame buffer can be cut, and the render pass of the first frame buffer may be redirected to the second frame buffer.

The following provides description by using the frame buffer 4, the frame buffer 5, and the frame buffer 6 in step 101 as an example. Specifically, the optimization module 2331 may perform determining for the frame buffer 4, the frame buffer 5, and the frame buffer 6 one by one in terms of the preset condition in the sequence in the linked list (that is, frame buffer 4→frame buffer 5→frame buffer 6) based on the obtained description information corresponding to the frame buffer 4, the frame buffer 5, and the frame buffer 6. Specifically, the optimization module 2331 performs determining for the frame buffer 4. The optimization module 2331 first determines whether an output of the frame buffer 4 is a color. If the output of the frame buffer 4 is a color, the optimization module 2331 determines whether the output texture map of the frame buffer 4 is the input texture map of the frame buffer 5. If the output texture map of the frame buffer 4 is the input texture map of the frame buffer 5, the optimization module 2331 continues to determine whether a resolution of the frame buffer 4 is greater than or equal to a resolution of the frame buffer 5. It should be noted that when determining is performed in terms of the preset condition, a sequence of performing determining in terms of the preset condition is not limited. That is, the optimization module 2331 may first determine whether the output is a color, then determine the resolution, and then determine a correlation between the frame buffers. This is not limited in this application. In this embodiment of this application, in an example, the description information of the frame buffer 4 meets the preset condition. In this case, the optimization module 2331 may determine that a relationship between the frame buffer 4 and the frame buffer 5 is that a render pass of the frame buffer 4 may be redirected to the frame buffer 5. The optimization module 2331 then continues to determine a relationship between the frame buffer 5 and the frame buffer 6 in the sequence in the linked list based on the preset condition.

In this embodiment of this application, in an example, a render pass of the frame buffer 5 may be redirected to the frame buffer 6. That is, in this embodiment, the render pass of the frame buffer 4 may be redirected to the frame buffer 5, and the render pass of the frame buffer 5 may be redirected to the frame buffer 6. In this case, the optimization module 2331 may determine, based on the relationship between the frame buffers, that both the render pass of the frame buffer 4 and the render pass of the frame buffer 5 may be redirected to the frame buffer 6. In other words, in this embodiment of this application, a plurality of frame buffers (which means two or more frame buffers) may be combined into a same frame buffer.

In this embodiment of this application, the optimization module 2331 may reorganize and optimize the rendering instruction based on the foregoing determining result, that is, recompile the rendering instruction, so that the GPU performs rendering based on the foregoing result in a process of performing rendering based on the rendering instruction, that is, renders rendering jobs corresponding to the frame buffer 4 and the frame buffer 5 to the frame buffer 6.

Specifically, to make a person in the art better understand a process of recompiling the instruction by the optimization module 2331 in this embodiment of this application, functions of instructions are first described in detail below.

(1) Instruction "glBindFramebuffer": Specifically, the graphics engine 233 and/or the GPU may obtain, based on the instruction "glBindFramebuffer", a frame buffer corresponding to a render pass corresponding to a rendering job that currently needs to be rendered. For example, the optimization module 2331 may obtain, by invoking the instruction "glBindFramebuffer", that a frame buffer corresponding to a render pass 4 is the frame buffer 4. That is, a rendering job corresponding to the render pass 4 is to be rendered to the frame buffer 4.

(2) Instruction "glBindTexture": Specifically, the graphics engine 233 and/or the GPU may obtain, based on the instruction "glBindTexture", an input texture map that needs to be introduced to render a rendering job to a current frame buffer. For example, the optimization module 2331 may obtain, by invoking the instruction "glBindTexture", that an input texture map of the frame buffer 4 is a texture 3. That is, the input texture map of the frame buffer 4 is an output texture map of a frame buffer 3.

(3) Instruction "glFramebufferTexure": Specifically, the graphics engine 233 and/or the GPU may obtain an output texture map of the current frame buffer based on the instruction "glFramebufferTexure". For example, the optimization module 2331 may obtain, by invoking the instruction "glFramebufferTexure", that the input texture map of the frame buffer 4 is the texture 4.

In this embodiment of this application, the process of recompiling the instruction by the optimization module 2331 may be as follows: The optimization module 2331 modifies an output object of a render pass, that is, modifies a frame buffer bound to the render pass, and modifies an input texture map bound to the frame buffer, to redirect the render pass. In an example, an original rendering sequence is frame buffer 4→frame buffer 5→frame buffer 6. After analysis, the optimization module 2331 determines that the frame buffer 4 and the frame buffer 5 may be cut, and the render pass 4 corresponding to the frame buffer 4 and the render pass 5 corresponding to the frame buffer 5 may be redirected to the frame buffer 6. In this case, the optimization module 2331 may recompile an instruction stream corresponding to each frame buffer. Specifically, an original instruction stream corresponding to the frame buffer 4 is glBindFramebuffer4 (the render pass 4 is bound to the frame buffer 4), glBindTexture3 (a rendering input of the frame buffer 4 is the texture 3), and glFramebufferTexture4 (a rendering output of the frame buffer 4 is the texture 4). After being recompiled by the optimization module 2331, the instruction stream is modified to glBindFramebuffer6 (used to indicate that the render pass 4 is bound to the frame buffer 6), glBindTexture3 (used to indicate that a rendering input of the frame buffer 6 is the texture 3), and glFramebufferTexture6 (used to indicate that a rendering output of the frame buffer 6 is the texture 4). An original instruction stream corresponding to the frame buffer 5 is glBindFramebuffer5 (the render pass 5 is bound to the frame buffer 5), glBindTexture4 (a rendering input of the frame buffer 5 is the texture 4), and glFramebufferTexture5 (a rendering output of the frame buffer 5 is the texture 5). After being recompiled by the optimization module 2331, the instruction stream is modified to glBindFramebuffer6 (used to indicate that the render pass 5 is bound to the frame buffer 6), disable glBindTexture4 (used to indicate that the rendering input of the frame buffer 5 is deleted), and glFramebufferTexture6 (used to indicate that the rendering output of the frame buffer 6 is the texture 6). An original instruction stream corresponding to the frame buffer 6 is glBindFramebuffer6 (a render pass 6 is bound to the frame buffer 6), glBindTexture5 (the rendering input of the frame buffer 6 is the texture 5), and glFramebufferTexture6 (the rendering output of the frame buffer 6 is the texture 6). After being recompiled by the optimization module 2331, the instruction stream is modified to glBindFramebuffer6 (used to indicate that the render pass 6 is bound to the frame buffer 6), disable glBindTexture5 (used to indicate that the rendering input of the frame buffer 6 is deleted), and glFramebufferTexture6 (used to indicate that the rendering output of the frame buffer 6 is the texture 6).

It should be noted that in this embodiment of this application, the instruction stream includes one or more lines of instructions. For example, an instruction stream prototype of the instruction "glBindFramebuffer" may be void glBindFramebuffer (GLenum target, GLuint framebuffer), where "GLuint framebuffer" may be used to indicate a frame buffer bound to a render pass. In this case, the optimization module 2331 may modify "GLuint framebuffer" to bind a specified frame buffer to the render pass. Content in the instruction may be set by a developer. Therefore, specific modification details of the instruction are not limited in this application.

Optionally, in this embodiment of this application, the optimization module 2331 may further establish a rendering list, as shown in Table 1:

TABLE 1

| ID | Resolution | Attribute information | Is cutting feasible? | ID of a frame buffer to which a redirection is made |
|---|---|---|---|---|
| Frame buffer 4 | 1280*616 | Color | Yes | Frame buffer 6 |
| Frame buffer 5 | 1280*616 | Color | Yes | Frame buffer 6 |
| Frame buffer 6 | 1280*616 | Color | Yes | Frame buffer 6 |

The optimization module 2331 correspondingly writes the extracted ID and description information of the frame buffer into the rendering list, and correspondingly writes a determining result (namely, a result about determining whether each frame buffer can be cut and an ID of a frame buffer to which a redirection is made after the frame buffer is cut) of each frame buffer into the rendering list. As shown in Table 1, after performing determining based on feature information of each frame buffer, the optimization module 2331 completes the rendering list, determines that both frame buffers whose IDs are 4 and 5 can be cut, and redirects the render passes of the frame buffers to the frame buffer 6.

Optionally, in this embodiment of this application, the optimization module 2331 may correspondingly store the rendering list and a name of the application program in a local list. Correspondingly, in the initialization process of the optimization module 2331, the optimization module 2331 may be further configured to: in a process of starting the application program, identify whether the name of the application program is stored in the local list, and determine, if the name of the application program is stored in the local list, that the rendering list corresponding to the application program is stored. The optimization module 2331 then may invoke the rendering list corresponding to the application program based on the local list. The optimization module 2331 then may detect whether there is a change to each frame buffer in the rendering list, for example, there is a deletion or an addition. If there is no change, the optimization module 2331 may directly compile the rendering instruction based on content in the rendering list, thereby further improving efficiency of a rendering program. If the optimization module 2331 detects that information about each current frame buffer is inconsistent with information about each frame buffer in the rendering list, the optimization module 2331 repeats step 101 and step 102.

Step 103: The CPU determines a rendering instruction based on the relationship between the first frame buffer and the second frame buffer.

Specifically, in this embodiment of this application, after the CPU (which specifically refers to the optimization module 2331) analyzes, reorganizes, and optimizes the related rendering instruction, the graphics engine 233 summarizes the compilation result of the optimization module 2331, and generates the compiled rendering instruction (it should be noted that in addition to a case in which the optimization module 2331 recompiles some rendering instructions, the graphics engine 233 may further recompile another rendering instruction. Details are not described in this application).

Step 104: The GPU renders a rendering job corresponding to the first frame buffer to the second frame buffer based on the rendering instruction.

In this embodiment of this application, the GPU may execute the rendering program based on the compiled rendering instruction, that is, execute the rendering program based on the relationship between the frame buffers indicated in the rendering instruction. In a possible implementation, the graphics engine 233 may store a compilation result, namely, the compiled rendering instruction, in a cache, and the GPU may read the rendering instruction from the cache, and perform a rendering operation based on the rendering instruction.

The example in steps 101 and 102 is still used for description. Specifically, in this embodiment of this application, in the rendering process, the GPU may perform a redirection operation on each frame buffer based on the instruction stream "glBindTexture".

Figure 4:
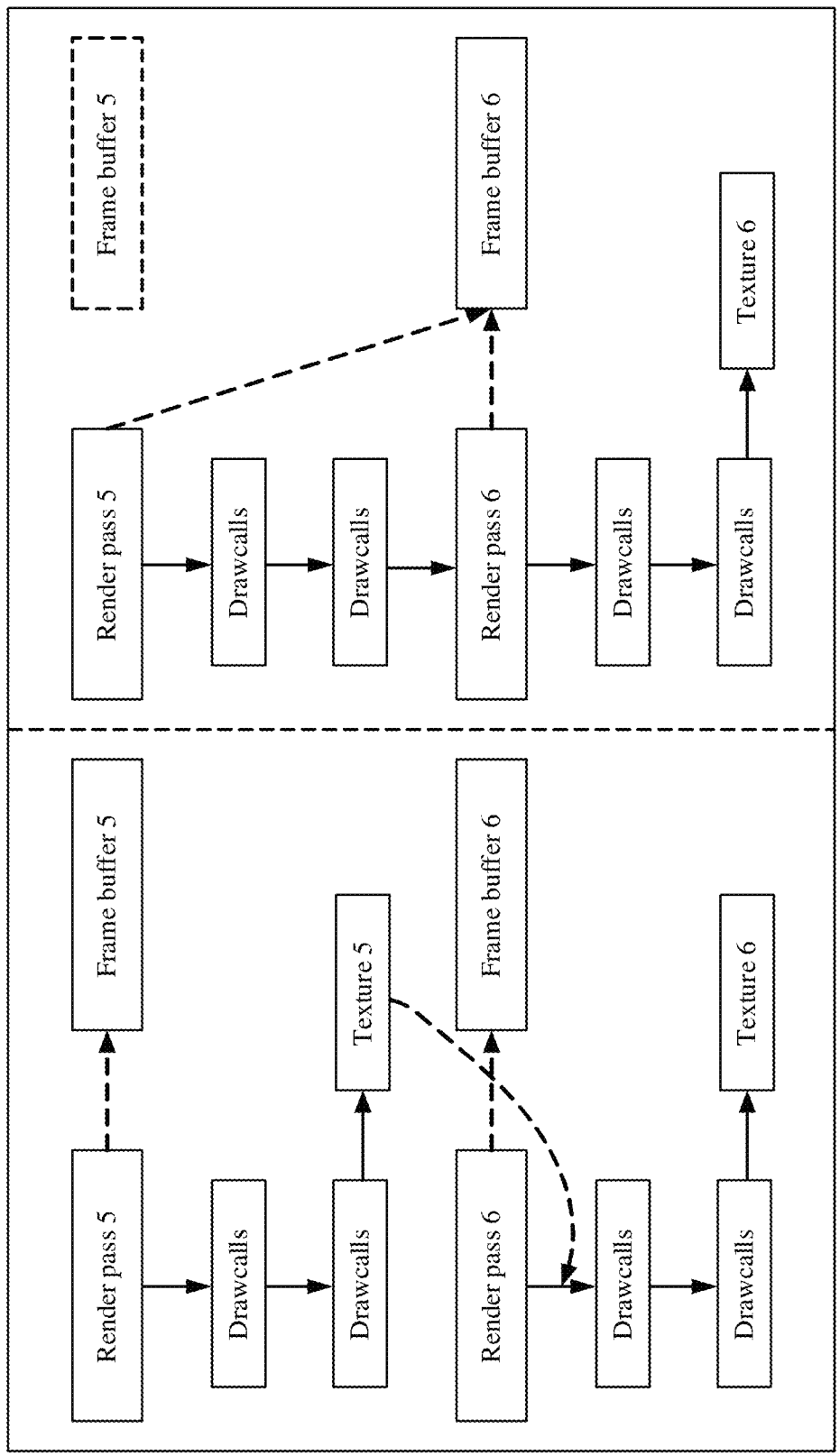
FIG. 4 is a comparison diagram of rendering results according to an embodiment of this application.

FIG. 4 is a schematic comparison diagram of rendering processes according to an embodiment of this application. In FIG. 4, a left side (namely, a left side of a dashed line) shows a rendering process of a frame buffer before the technical solution in this embodiment of this application is executed, and a right side (namely, a right side of the dashed line) shows a rendering process of a frame buffer after the technical solution in this embodiment of this application is executed.

Referring to the left side in FIG. 4, RenderPass is used to indicate a render pass. One render pass usually corresponds to one frame buffer. Drawcall is used to indicate a rendering instruction. When the GPU executes the rendering instruction, the GPU renders data to a frame buffer corresponding to a render pass, and a rendering output result is a texture map (Texture). In FIG. 4, the render pass 5 corresponds to the frame buffer 5, and the output texture map is the texture 5. An output result of the frame buffer 5 is the texture 5, the texture 5 is the input of the render pass 6, the render pass 6 corresponds to the frame buffer 6, and the output of the frame buffer 6 is the texture 6.

Referring to the right side in FIG. 4, in this embodiment of this application, the optimization module 2331 determines that the frame buffer 5 can be cut (a dashed line in the figure indicates that the frame buffer 5 has been cut), and redirects the render pass of the frame buffer 5 to the frame buffer 6. In this case, in the rendering process, the GPU may render a rendering job originally belonging to the frame buffer 5 to the frame buffer 6 based on the relationship that is between the frame buffer 5 and the frame buffer 6 and that is indicated in the rendering instruction, that is, redirect the render pass originally corresponding to the frame buffer 5 to the frame buffer 6, to implement a redirection between the frame buffer 5 and the frame buffer 6. The GPU then executes the rendering program in the frame buffer 6, and outputs the texture 6.

In conclusion, in the technical solution in this embodiment of this application, render passes of one or more frame buffers are redirected to another frame buffer, to implement rendering process optimization on a device (for example, a terminal) side without depending on an application manufacturer. In addition, in a rendering process of an application program in this embodiment of this application, a quantity of frame buffers used in the rendering process may be reduced through redirection, and therefore, read/write and/or copy operations on the frame buffer in the rendering process can be reduced. In this way, memory occupation of the GPU can be effectively reduced, bandwidth of the GPU can be reduced, and power consumption can be reduced. Furthermore, in an execution process of the technical solution in this embodiment of this application, original logic of an application is not modified, and therefore, system-level memory and power consumption optimization can be implemented. That is, no problem of frame freezing is caused during optimization, and a user is unaware of the optimization, thereby further improving user experience.

To make a person skilled in the art better understand the technical solutions in the embodiments of this application, the following provides detailed description by using a specific embodiment.

Figure 5:
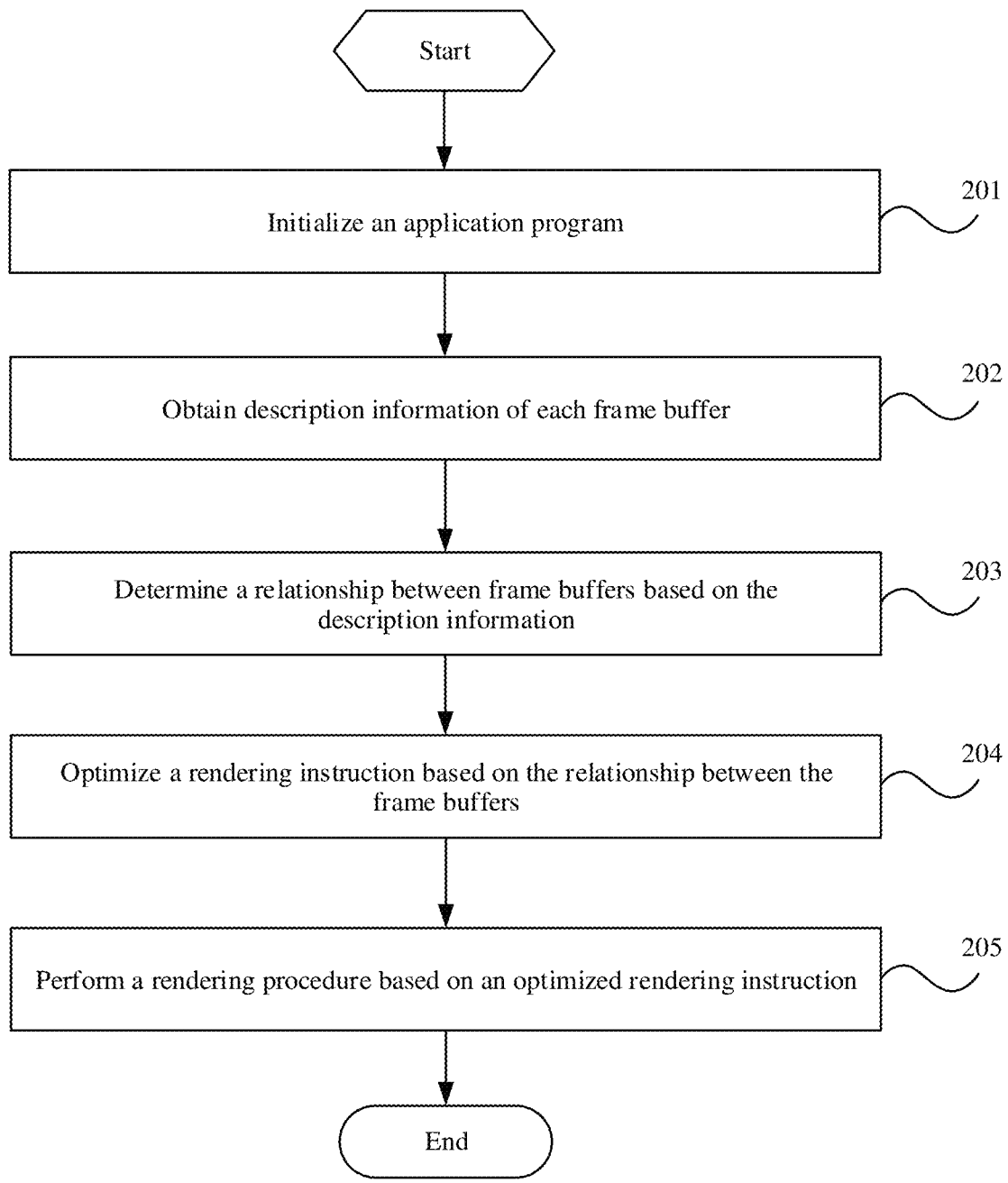
FIG. 5 is a flowchart of a rendering method according to an embodiment of this application.

FIG. 5 is a flowchart of steps of a rendering method according to an embodiment of this application. In FIG. 5, Step 201: Initialize an application program.

Specifically, in this embodiment of this application, after the application program is started, an optimization module 2331 is initialized. In an initialization process of the optimization module 2331, a graphics engine 233 detects whether a rendering list corresponding to the application program is locally stored. If the rendering list corresponding to the application program is locally stored, the graphics engine 233 detects whether there is a change to information in the rendering list. If there is no change, step 20 is performed. If there is a change, step 202 is performed. If no corresponding rendering list is detected, it is determined that the application program is started for the first time or the rendering list corresponding to the application program is deleted. In this case, the graphics engine 233 detects whether the application program needs a rendering procedure (that is, detects whether there is a rendering-related rendering instruction). If the application program needs the rendering procedure, it may be determined that the technical solution in this embodiment of this application is applicable to the application program, and step 202 is performed.

Step 202: A CPU obtains description information of each frame buffer.

Specifically, in this embodiment of this application, after the application program and each module are initialized, the graphics engine 233 may invoke an instruction including a rendering instruction in the application program, and compile the instruction. In this embodiment, compilation only of the rendering instruction is used as an example for description. Compilation means that the graphics engine 233 analyzes, reorganizes, and optimizes the rendering instruction, so that a GPU executes a rendering procedure based on an optimized rendering instruction in a rendering process.

Specifically, in this embodiment of this application, the graphics engine 233 allocates a specified instruction stream to the optimization module 2331. In this embodiment of this application, the specified instruction stream includes but is not limited to glGenFramebuffers, glFramebufferTexture, and glBindTexture.

The optimization module 2331 generates a rendering list, as shown in Table 2. Entries without data (also referred to as blank entries) in Tables 2-3 are listed as "N/A", and correspond to "not available." The optimization module 2331 may name the rendering list, and locally and correspondingly store the rendering list and a program name of the application program, to establish a correspondence between the application program and the rendering list.

TABLE 2

| ID | Resolution | Attribute information | Is cutting feasible? | ID of a frame buffer to which a redirection is made |
|---|---|---|---|---|
| N/A | N/A | N/A | N/A | N/A |
| N/A | N/A | N/A | N/A | N/A |
| N/A | N/A | N/A | N/A | N/A |

The optimization module 2331 then obtains, based on the instruction "glGenFramebuffers", an ID of each frame buffer generated by the graphics engine 233. In addition, the optimization module 2331 may obtain attribute information, a resolution, an output texture map, and an input texture map of each frame buffer based on "glFramebufferTexture".

The optimization module 2331 then may add the obtained description information (including the attribute information and the resolution) and ID of each frame buffer to Table 2. After addition, a case is shown in Table 3:

TABLE 3

| ID | Resolution | Attribute information | Is cutting feasible? | ID of a frame buffer to which a redirection is made |
|---|---|---|---|---|
| Frame buffer 3 | 1280 * 616 | Depth | N/A | N/A |
| Frame buffer 4 | 1280 * 616 | Color | N/A | N/A |
| Frame buffer 5 | 1280 * 616 | Color | N/A | N/A |
| Frame buffer 6 | 1280 * 616 | Color | N/A | N/A |

Step 203: The CPU determines a relationship between frame buffers based on the description information.

Specifically, in this embodiment of this application, the optimization module 2331 may determine, based on information (namely, the input texture map and the output texture map of each frame buffer) obtained in step 202, a linked list corresponding to the frame buffer. In this embodiment, the optimization module 2331 obtains that an output texture map of the frame buffer 4 is a texture 4, an input texture map of the frame buffer 5 is the texture 4, an output texture map of the frame buffer 5 is a texture 5, an input texture map of the frame buffer 6 is the texture 5, and an output texture map of the frame buffer 6 is a texture 6. Based on the foregoing information, the optimization module 2331 may establish a linked list: frame buffer 4→frame buffer 5→frame buffer 6. That is, a next frame buffer associated with the frame buffer 4 is the frame buffer 5, and a next frame buffer associated with the frame buffer 5 is the frame buffer 6. The frame buffer 3 in Table 3 is an independent frame buffer, that is, an output texture map of the frame buffer 3 is not an input texture map of any frame buffer. Therefore, the linked list does not include the frame buffer 3.

The optimization module 2331 then may perform determining for the frame buffers one by one in the linked list based on a preset condition and the obtained description information (namely, information in Table 3), to determine the relationship between the frame buffers. In this embodiment of this application, the preset condition includes but is not limited to: Attribute information is a color, a resolution of a current frame buffer is greater than or equal to that of a next frame buffer (namely, a next frame buffer associated with the frame buffer in the linked list), and an output texture map of the frame buffer is an input texture map of the next frame buffer.

Specifically, for the frame buffer 4 that appears first in the linked list, the optimization module 2331 obtains that attribute information of the frame buffer 4 is a color, the output texture map of the frame buffer 4 is the input texture map of the frame buffer 5, and a resolution of the frame buffer 4 is equal to a resolution of the frame buffer 5. Therefore, the optimization module 2331 determines that the frame buffer 4 meets the preset condition. In this case, the optimization module 2331 may determine that the frame buffer 4 can be cut, and a render pass of the frame buffer 4 may be redirected to the frame buffer 5. The optimization module 2331 then performs determining for the frame buffers in the linked list in terms of the preset condition in a sequence in the linked list, to determine whether each frame buffer can be cut and an ID of a frame buffer to which a redirection is made. After determining, the optimization module 2331 may add a determining result to Table 3. A completed rendering list is shown in Table 4:

TABLE 4

| ID | Resolution | Attribute information | Is cutting feasible? | ID of a frame buffer to which a redirection is made |
|---|---|---|---|---|
| Frame buffer 3 | 1280*616 | Depth | No | — |
| Frame buffer 4 | 1280*616 | Color | Yes | Frame buffer 6 |
| Frame buffer 5 | 1280*616 | Color | Yes | Frame buffer 6 |
| Frame buffer 6 | 1280*616 | Color | Yes | Frame buffer 6 |

Step 204: The CPU optimizes the rendering instruction based on the relationship between the frame buffers.

Specifically, in this embodiment of this application, the optimization module 2331 may optimize the rendering instruction based on a result in the rendering list, namely, the relationship between the frame buffers indicated by the description information corresponding to the frame buffers. Specifically, the optimization module 2331 may recompile an instruction stream corresponding to each frame buffer. Specifically, an original instruction stream corresponding to the frame buffer 4 is glBindFramebuffer4 (a render pass 4 is bound to the frame buffer 4), glBindTexture3 (a rendering input of the frame buffer 4 is a texture 3), and glFramebufferTexture4 (a rendering output of the frame buffer 4 is the texture 4). After being recompiled by the optimization module 2331, the instruction stream is modified to glBindFramebuffer6 (used to indicate that the render pass 4 is bound to the frame buffer 6), glBindTexture3 (used to indicate that a rendering input of the frame buffer 6 is the texture 3), and glFramebufferTexture6 (used to indicate that a rendering output of the frame buffer 6 is the texture 4). An original instruction stream corresponding to the frame buffer 5 is glBindFramebuffer5 (a render pass 5 is bound to the frame buffer 5), glBindTexture4 (a rendering input of the frame buffer 5 is the texture 4), and glFramebufferTexture5 (a rendering output of the frame buffer 5 is the texture 5). After being recompiled by the optimization module 2331, the instruction stream is modified to glBindFramebuffer6 (used to indicate that the render pass 5 is bound to the frame buffer 6), disable glBindTexture4 (used to indicate that the rendering input of the frame buffer 5 is deleted), and glFramebufferTexture6 (used to indicate that the rendering output of the frame buffer 6 is the texture 6). An original instruction stream corresponding to the frame buffer 6 is glBindFramebuffer6 (a render pass 6 is bound to the frame buffer 6), glBindTexture5 (the rendering input of the frame buffer 6 is the texture 5), and glFramebufferTexture6 (the rendering output of the frame buffer 6 is the texture 6). After being recompiled by the optimization module 2331, the instruction stream is modified to glBindFramebuffer6 (used to indicate that the render pass 6 is bound to the frame buffer 6), disable glBindTexture5 (used to indicate that the rendering input of the frame buffer 6 is deleted), and glFramebufferTexture6 (used to indicate that the rendering output of the frame buffer 6 is the texture 6).

Step 205: The GPU performs a rendering procedure based on an optimized rendering instruction.

Specifically, in this embodiment of this application, in the rendering process, the GPU may render, based on the relationship that is between the frame buffers and that is indicated in the rendering instruction (including a rendering instruction optimized by the optimization module 2331) optimized by the graphics engine 233 and an indication of the rendering instruction, a rendering job corresponding to a frame buffer that can be cut to a frame buffer to which a redirection is made.

For example, when rendering a rendering job 4 corresponding to the render pass 4, the GPU invokes instructions, namely, glBindFramebuffer6, glBindTexture3, and glFramebufferTexture6, corresponding to the render pass 4, and renders the rendering job 4 to the frame buffer 6 based on the instructions. A rendering input introduced during rendering is the texture 3, and an output rendering result is the texture 6. When rendering a rendering job 5 corresponding to the render pass 5, the GPU invokes instructions, namely, glBindFramebuffer6, disable glBindTexture4, and glFramebufferTexture6, corresponding to the render pass 5, and renders the rendering job 5 to the frame buffer 6 based on the instructions. An output rendering result is the texture 6. When rendering a rendering job 6 corresponding to the render pass 6, the GPU invokes instructions, namely, glBindFramebuffer6, disable glBindTexture5, and glFramebufferTexture6, corresponding to the render pass 6, and renders the rendering job 6 to the frame buffer 6 based on the instruction. An output rendering result is the texture 6.

Figure 6:
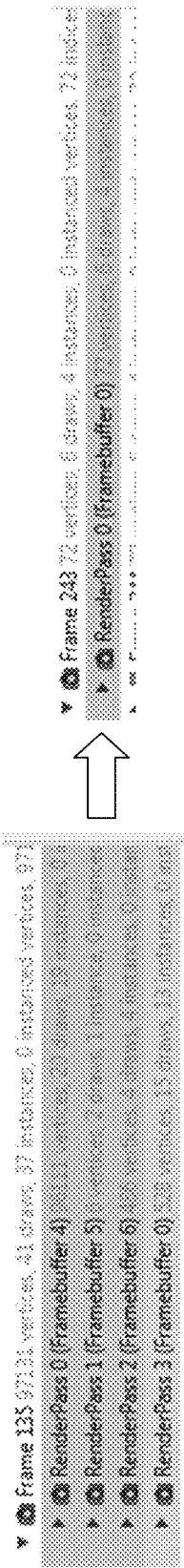
FIG. 6 is a comparison diagram of rendering results according to an embodiment of this application.

To verify an optimization effect of the technical solutions in the embodiments of this application on memory and power consumption in a rendering process, a technician performs an experimental operation on a game A based on the apparatus and the method designed in the embodiments of this application. The following results are obtained:

In a process of the game A, a device performs a rendering operation on the game A. The technician captures, by using a capture tool, that four frame buffers (a frame buffer 4, a frame buffer 5, a frame buffer 6, and a frame buffer 0) included in the game A are combined into one frame buffer, that is, the frame buffer 4, the frame buffer 5, and the frame buffer 6 can be cut, and render passes of the frame buffer 4, the frame buffer 5, and the frame buffer 6 may be redirected to the frame buffer 0. A capture result is shown in FIG. 6. A left side (namely, a left side of the arrow) in FIG. 6 shows a capture result before the technical solutions in the embodiments of this application are implemented, and a right side (namely, a right side of the arrow) in FIG. 6 shows a capture result after the technical solutions in the embodiments of this application are implemented. Apparently, after the rendering method in the embodiments of this application is used, in a rendering process, a GPU needs to perform rendering only to one frame buffer instead of to four frame buffers.

Table 5 shows an optimization result of a device after the rendering method in the embodiments of this application is applied:

TABLE 5

| Before optimization | | After optimization | | | |
|---|---|---|---|---|---|
| Power consumption (mA) | DDR frequency (MHz) | Power consumption (mA) | DDR frequency (MHz) | Optimization gain | |
| | | | | Power consumption | DDR frequency |
| 674.4 | 763 | 617.3 | 677 | 8.50% | 11.30% |

It may be learned from Table 5 that according to the rendering method in the embodiments of this application, after at least one frame buffer is combined into another frame buffer, a power consumption gain is 8.50%, and a DDR frequency gain is 11.30%. Apparently, according to the rendering method in the embodiments of this application, one or more frame buffers are redirected to another frame buffer, and therefore, occupation of the frame buffer is effectively reduced. In addition, a quantity of frame buffers is reduced, and correspondingly, in a rendering process, read/write and/or copy operations performed by a GPU on the frame buffer are also reduced. For example, as shown in FIG. 6, before optimization, the GPU needs to perform a rendering operation (including read/write and/or copy) on four frame buffers. After optimization, the GPU needs to perform a rendering operation only on one frame buffer. Therefore, power consumption can be reduced while memory occupation is reduced, and a problem that a device generates heat in a running process of an application program is effectively avoided, thereby improving user experience. In addition, in the technical solutions in the embodiments of this application, the rendering method in the embodiments of this application can be performed by only adding an optimization module 2331 to a device. In this way, any application program that runs in the device and meets a condition for performing the rendering method in the embodiments of this application can achieve the foregoing optimization effect, and a rendering manner independent of rendering optimization of an application program is provided. Furthermore, a rendering process of the application program may be further optimized with reference to a rendering optimization effect of the application program.

The foregoing mainly describes the solutions provided in the embodiments of this application from a perspective of interaction between network elements. It may be understood that to implement the foregoing functions, the rendering apparatus includes corresponding hardware structures and/or software modules for executing the functions. A person skilled in the art should be easily aware that the example units, algorithms, and steps described with reference to the embodiments disclosed in this specification can be implemented in the embodiments of this application by using hardware or a combination of hardware and computer software. Whether a function is executed by hardware or hardware driven by computer software depends on particular applications and design constraints of the technical solutions. A person skilled in the art may use different methods to implement the described functions for each particular application, but it should not be considered that this implementation goes beyond the scope of this application.

In the embodiments of this application, the rendering apparatus may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that in the embodiments of this application, module division is an example, and is merely logical function division. In actual implementation, another division manner may be used.

Figure 7:
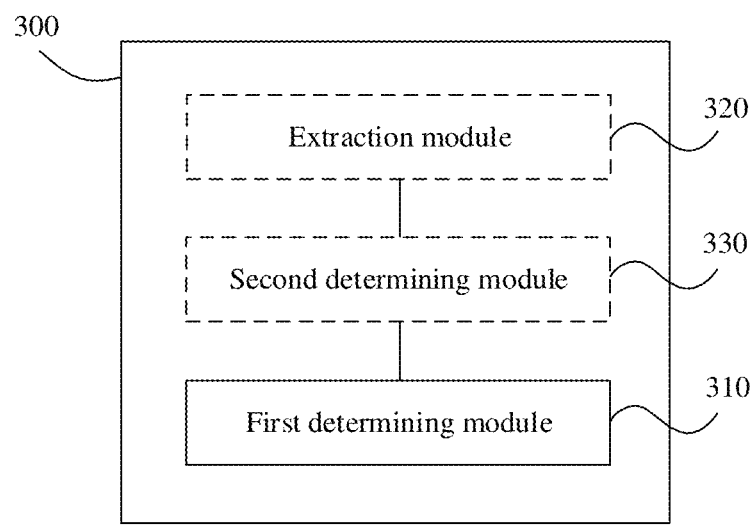
FIG. 7 is a schematic structural diagram of a rendering apparatus according to an embodiment of this application.

When each function module is obtained through division based on each corresponding function, FIG. 7 is a possible schematic structural diagram of a rendering apparatus 300 in the foregoing embodiment. As shown in FIG. 7, the rendering apparatus may include a first determining module 310. The first determining module 310 may be configured to perform a step of "determining a rendering instruction based on a relationship between a first frame buffer and a second frame buffer". For example, the module may be configured to support the rendering apparatus in performing step 103 and step 204 in the foregoing method embodiments.

Optionally, in this embodiment of this application, the rendering apparatus 300 may further include an extraction module 320 and a second determining module 330. The extraction module 320 may be configured to perform a step of "extracting first description information of the first frame buffer and second description information of the second frame buffer". For example, the module may be configured to support the rendering apparatus in performing step 101 and step 202 in the foregoing method embodiments. The second determining module 330 may be configured to perform a step of "determining the relationship between the first frame buffer and the second frame buffer based on the first description information and the second description information". For example, the module may be configured to support the rendering apparatus in performing step 102 and step 203 in the foregoing method embodiments.

All related content of the steps in the foregoing method embodiments may be cited in function description of corresponding function modules. Details are not described herein again.

Based on a same technical concept, an embodiment of this application further provides a computer-readable storage medium. The computer-readable storage medium stores a computer program. The computer program includes at least one segment of code. The at least one segment of code may be executed by a rendering apparatus, to control the rendering apparatus to implement the foregoing method embodiment.

Based on a same technical concept, an embodiment of this application further provides a computer program. When the computer program is executed by a rendering apparatus, the foregoing method embodiment is implemented.

The program may be completely or partially stored in a storage medium encapsulated with a processor, or may be partially or completely stored in a memory not encapsulated with a processor.

Based on a same technical concept, an embodiment of this application further provides a processor. The processor is configured to implement the foregoing method embodiment. The processor may be a chip.

Methods or algorithm steps described with reference to the content disclosed in the embodiments of this application may be implemented by hardware, or may be implemented by a processor by executing a software instruction. The software instruction may include a corresponding software module. The software module may be stored in a random access memory (Random Access Memory, RAM), a flash memory, a read-only memory (Read Only Memory, ROM), an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium that is well known in the art. For example, a storage medium is coupled to a processor, so that the processor can read information from the storage medium, and may write information into the storage medium. Certainly, the storage medium may be a component of the processor. The processor and the storage medium may be located in an ASIC. In addition, the ASIC may be located in a network device. Certainly, the processor and the storage medium may exist in the network device as discrete components.

A person skilled in the art should be aware that in the foregoing one or more examples, the functions described in the embodiments of this application may be implemented by hardware, software, firmware, or any combination thereof. When the present invention is implemented by software, the foregoing functions may be stored in a computer-readable medium or transmitted as one or more instructions or code in a computer-readable medium. The computer-readable medium includes a computer storage medium and a communications medium. The communications medium includes any medium that enables a computer program to be transmitted from one place to another. The storage medium may be any available medium accessible to a general-purpose or dedicated computer.

The embodiments of this application are described above with reference to the accompanying drawings. However, this application is not limited to the foregoing specific implementations. The foregoing specific implementations are merely examples, and are not intended to constitute a limitation. Inspired by this application, a person of ordinary skill in the art may make various forms without departing from the spirit of this application and the protection scope of the claims, which shall fall within the protection scope of this application.

What is claimed is:

1. A rendering method, wherein the method comprises:
   extracting first description information of a first frame buffer and second description information of a second frame buffer;
   determining a relationship between the first frame buffer and the second frame buffer based on the first description information and the second description information, wherein the determining the relationship between the first frame buffer and the second frame buffer comprises:
      determining that a render pass of the first frame buffer is configured to be redirected to the second frame buffer in response the first description information and the second description information meeting a first preset condition, a second preset condition and a third preset condition;
   determining a rendering instruction based on the relationship between the first frame buffer and the second frame buffer, wherein the relationship between the first frame buffer and the second frame buffer is used to indicate that the render pass of the first frame buffer can be redirected to the second frame buffer; and
   the rendering instruction is used to instruct a graphics processing unit (GPU) to render a rendering job corresponding to the first frame buffer to the second frame buffer.

2. The method according to claim 1, wherein the relationship between the first frame buffer and the second frame buffer comprises the first description information of the first frame buffer and the second description information of the second frame buffer.

3. The method according to claim 1, wherein the first description information comprises:
   an attribute of the first frame buffer, a resolution of the first frame buffer, and an input texture map and an output texture map of the first frame buffer, wherein the attribute is useable to indicate whether an output of the first frame buffer is a color.

4. The method according to claim 1, wherein
   the first preset condition comprises: an output of the first frame buffer is a color;
   the second preset condition comprises: an output texture map of the first frame buffer is an input texture map of the second frame buffer; and the third preset condition comprises: a resolution of the first frame buffer is greater than or equal to a resolution of the second frame buffer.

5. A computer-readable storage medium, wherein the computer-readable storage medium is configured to store non-transitory instructions, and in response to the non-transitory instructions being executed by one or more processors cause the one or more processors to:
   extract first description information of a first frame buffer and second description information of a second frame buffer;
   determine that a render pass of the first frame buffer is configured to be redirected to the second frame buffer in response to the first description information and the second description information meeting a first preset condition, a second preset condition and a third preset condition;
   determine a rendering instruction based on a relationship between the first frame buffer and the second frame buffer, wherein the relationship between the first frame buffer and the second frame buffer is used to indicate that the render pass of the first frame buffer can be redirected to the second frame buffer; and
   the rendering instruction is used to instruct a graphics processing unit (GPU) to render a rendering job corresponding to the first frame buffer to the second frame buffer.

6. The computer-readable storage medium according to claim 5, wherein the relationship between the first frame buffer and the second frame buffer comprises the first description information of the first frame buffer and the second description information of the second frame buffer.

7. The computer-readable storage medium according to claim 5, wherein in response to the non-transitory instructions being executed by the one or more processors further causes the one or more processors to:
   determine the relationship between the first frame buffer and the second frame buffer based on the first description information and the second description information.

8. The computer-readable storage medium according to claim 5, wherein the first description information comprises:
   an attribute of the first frame buffer, a resolution of the first frame buffer, and an input texture map and an output texture map of the first frame buffer, wherein the attribute is useable to indicate whether an output of the frame buffer is a color.

9. The computer-readable storage medium according to claim 5, wherein
   the first preset condition comprises: an output of the first frame buffer is a color;
   the second preset condition comprises: an output texture map of the first frame buffer is an input texture map of the second frame buffer; and
   the third preset condition comprises: a resolution of the first frame buffer is greater than or equal to a resolution of the second frame buffer.

10. A computer device, wherein the computer device comprises one or more processors and a memory, the memory is configured to store non-transitory instructions, and the one or more processors is configured to execute the non-transitory instructions thereby causing the one or more processors to:
    extract first description information of a first frame buffer and second description information of a second frame buffer;
    determine that a render pass of the first frame buffer is configured to be redirected to the second frame buffer in response the first description information and the second description information meeting a first preset condition, a second preset condition and a third preset condition;
    determine a rendering instruction based on a relationship between the first frame buffer and the second frame buffer, wherein the relationship between the first frame buffer and the second frame buffer is used to indicate that the render pass of the first frame buffer can be redirected to the second frame buffer; and
    the rendering instruction is used to instruct a graphics processing unit (GPU) to render a rendering job corresponding to the first frame buffer to the second frame buffer.

11. The computer device according to claim 10, wherein the relationship between the first frame buffer and the second frame buffer comprises the first description information of the first frame buffer and the second description information of the second frame buffer.

12. The computer device according to claim 10, wherein in response to the non-transitory instructions being executed by the one or more processors further causes the one or more processors to:
    determine the relationship between the first frame buffer and the second frame buffer based on the first description information and the second description information.

13. The computer device according to claim 10, wherein the first description information comprises:
    an attribute of the first frame buffer, a resolution of the first frame buffer, and an input texture map and an output texture map of the first frame buffer, wherein the attribute is useable to indicate whether an output of the first frame buffer is a color.

14. The computer device according to claim 10, wherein
    the first preset condition comprises: an output of the first frame buffer is a color;
    the second preset condition comprises: an output texture map of the first frame buffer is an input texture map of the second frame buffer; and
    the third preset condition comprises: a resolution of the first frame buffer is greater than or equal to a resolution of the second frame buffer.

\* \* \* \* \*